United States Patent
Stuehrmann et al.

(10) Patent No.: US 10,440,528 B2
(45) Date of Patent: Oct. 8, 2019

(54) SYSTEM AND METHOD FOR DETERMINING CONVERSION RATE FOR SHORT MESSAGE SERVICE (SMS) MESSAGING

(71) Applicant: Syniverse Technologies, LLC, Tampa, FL (US)

(72) Inventors: Stefan Stuehrmann, Gerbrunn (DE); Michael Krolikowski, Wurzburg (DE); Thomas Hopfengaertner, Heroldsbach (DE); Markus Roder, Kitzingen (DE)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/415,140

(22) Filed: May 17, 2019

(65) Prior Publication Data
US 2019/0274013 A1    Sep. 5, 2019

Related U.S. Application Data

(62) Division of application No. 16/238,247, filed on Jan. 2, 2019.

(60) Provisional application No. 62/612,870, filed on Jan. 2, 2018.

(51) Int. Cl.
H04W 4/18    (2009.01)
H04W 4/14    (2009.01)

(52) U.S. Cl.
CPC .............. *H04W 4/14* (2013.01); *H04W 4/18* (2013.01)

(58) Field of Classification Search
CPC .......... H04W 4/00; H04W 4/06; H04W 4/12; H04W 4/14; H04W 4/18; H04W 4/20; H04W 4/30
See application file for complete search history.

(56) References Cited

U.S. PATENT DOCUMENTS

| | | | | |
|---|---|---|---|---|
| 7,020,685 | B1* | 3/2006 | Chen | H04W 88/02 455/403 |
| 2002/0177448 | A1* | 11/2002 | Moran | H04L 41/00 455/456.1 |
| 2008/0287150 | A1* | 11/2008 | Jiang | G06Q 30/0277 455/466 |
| 2015/0310438 | A1* | 10/2015 | Kassemi | G06Q 20/405 705/44 |

* cited by examiner

*Primary Examiner* — San Htun
(74) *Attorney, Agent, or Firm* — Molly L. Sauter; Smith & Hopen, P.A.

(57) ABSTRACT

A method for detecting SMS messaging service interruptions by classifying SMS messages as delivered or undelivered based upon the receipt of a successful conversion message within a predetermined time period. A current conversion rate is calculated for each network operator partner and destination network pair and the current conversion rate is compared against a reference conversion rate to identify a decrease in the conversion rate of the SMS messages. If the conversion rate decrease exceeds a predefined value, the channel between the network operator partner and the destination network pair is flagged and subsequent SMS messages are routed to end users via an alternative destination network.

19 Claims, 3 Drawing Sheets

SYSTEM AND METHOD FOR DETERMINING CONVERSION RATE FOR SHORT MESSAGE SERVICE (SMS) MESSAGING

CROSS-REFERENCE TO RELATED APPLICATIONS

This application is a divisional of U.S. patent application Ser. No. 16/238,247, entitled "System and Method for Determining Conversion Rate for Short Message Service (SMS) Messaging", filed Jan. 2, 2019, which claims priority to U.S. Provisional Patent Application No. 62/612,870, entitled "A Method of Determining Conversion Rate for SMS Messages", filed Jan. 2, 2018, the entirety of which are incorporated herein by reference.

BACKGROUND OF THE INVENTION

Reliability is a key concern in telecommunications, and it is therefore critical that a decrease in delivery quality of Short Message Service (SMS) messages must be detected early so that remedial measures can be timely implemented. Currently, there are two common solutions for real-time route quality measurement. The first solution entails processing delivery reports provided by the destination network of the delivering channel responsible for delivering the SMS messages to the end user. A major disadvantage of this solution is that some destination networks provide false delivery reports. This problem is further exacerbated by lack of options to discern whether the reports are accurate or false. Furthermore, many delivering channels do not currently provide any form of deliver reporting (DLR) or statistics.

The second method of detecting delivery interruptions requires using a third-party solution based on SIM (Subscriber Identify Module) routing. A major disadvantage of this method is that the third-party test SIM cards can be detected by the delivering channel and routed with higher quality than the standard SMS traffic. Therefore, the third-party reporting may not be representative of the actual delivery quality of that channel. Additionally, in SIM routing, live traffic cannot be tested and the cost of this method, per SMS message, is extremely high.

Thus, there exists an unresolved need for a method of determining a conversion rate of a delivery channel between a network operator partner and a destination network which also provides the ability to take remedial measures when the quality of the SMS delivery decreases below an acceptable threshold value.

SUMMARY OF THE INVENTION

In various embodiments, the present invention provides a system and method for determining a conversion rate of a delivery channel for SMS messages which allows for the rerouting of SMS messages between a network operator partner and a destination network when the quality of the SMS delivery decreases below an acceptable threshold value.

In one embodiment, the present invention provides a method for determining a current conversion rate for Short Message Service (SMS) messaging. The method includes, receiving a plurality of SMS messages at a conversion rate processor and monitoring a conversion timeout period for each of the plurality of SMS messages at the conversion rate processor. The method further includes, receiving one or more successful conversion messages at the conversion rate processor, wherein a successful conversion messages is generated by a network operator partner for each of the plurality of SMS messages if an action is performed by an end user in response to the SMS messages delivered to the end user by a destination network prior to the expiration of the conversion timeout period. The method additionally includes, calculating a current conversion rate at the conversion rate processor following the receipt of the one or more successful conversion messages or following expiration of the conversion timeout period for one or more of the plurality of SMS messages, wherein calculating a current conversion rate further includes, identifying a current conversion rate time window, determining a total number of SMS messages ($N_1$) of the plurality of SMS messages submitted by the network operator partner during the current conversion rate time window, determining a number of successful conversion messages ($N_2$) received at the conversion rate processor during the current conversion rate time window and calculating the current conversion rate (CR) as:

$$CR = \frac{\min(N_1, N_2)}{N_1}.$$

The method may further include, comparing the current conversion rate and a reference conversion rate and flagging the destination network and network operator partner combination if the current conversion rate exceeds a predetermined threshold, wherein the reference conversion rate is a historical aggregated exponential weighted moving average ($EWMA_n$) calculated using a suitable coefficient $\alpha$ as:

$$EWMA_n = \begin{cases} CR_1 & n = 1 \\ \alpha \times CR_n \div (1-\alpha) \times EWMA_{n-1}, & n > 1 \end{cases}$$

over a period of time with n current conversion rate samples.

In an additional embodiment, a method for determining a current conversion rate for Short Message Service (SMS) messaging includes, submitting a plurality of SMS messages to a routing system, wherein the SMS messages are submitted by a network operator partner and are destined for an end user, delivering the plurality of SMS messages to a destination network using the routing system, delivering the plurality of SMS messages to a conversion rate processor using the routing system, monitoring a conversion timeout period for each of the plurality of SMS messages at the conversion rate processor and delivering the plurality of SMS messages to the end user using the destination network. The method further includes, detecting, by the network operator partner, if an action has been performed by the end user in response to each of the plurality of SMS messages, generating a successful conversion message at the network operator for the SMS message if the action is performed by the end user prior to the expiration of the conversion timeout period for the SMS message and delivering the successful conversion message to the conversion rate processor, calculating a current conversion rate at the conversion rate processor following the receipt of one or more successful conversion messages at the current conversion rate processor or following expiration of the conversion timeout period for one or more of the plurality of SMS messages and providing the current conversion rate to the routing system.

The method may further include, comparing the current conversion rate and a reference conversion rate at the routing system and flagging the destination network and network operator partner combination if the current conversion rate exceeds a predetermined threshold.

In an additional embodiment, the present invention provides a system for determining a current conversion rate for Short Message Service (SMS) messaging. The system may include, a routing system for receiving a plurality of SMS messages from a network operator partner, for delivering the plurality of SMS messages to a destination network and for delivering the plurality of SMS messages to a conversion rate processor, wherein the plurality of SMS messages are destined for an end user. The conversion rate processor may be configured for monitoring a conversion timeout period for each of the plurality of SMS messages and for calculating a current conversion rate following the receipt of one or more successful conversion messages from the network operator partner or following expiration of the conversion timeout period for one or more of the plurality of SMS messages, wherein the one or more successful conversion messages are provided to the conversion rate processor from the network operator partner in response to an action being performed by the end user in response to one of the plurality of SMS messages prior to the expiration of the conversion timeout period for the SMS message.

The routing system may further be configured for comparing the current conversion rate and a reference conversion rate, for flagging a destination network and network operator partner combination if the current conversion rate exceeds a predetermined threshold and for rerouting subsequent SMS messages between the flagged destination network and network operator partner combination to a different destination network over the routing system.

In another embodiment, the present invention provides a computer program product comprising computer executable instructions embodied in a non-transitory computer-readable medium for performing steps to determine a current conversion rate for Short Message Service (SMS) messaging. The steps may include, receiving a plurality of SMS messages at a conversion rate processor, monitoring a conversion timeout period for each of the plurality of SMS messages at the conversion rate processor, receiving one or more successful conversion messages at the conversion rate processor, wherein a successful conversion messages is generated by a network operator for each of the plurality of SMS messages if an action is performed by an end user in response to the SMS messages delivered to the end user prior to the expiration of the conversion timeout period, calculating a current conversion rate at the conversion rate processor following the receipt of the one or more successful conversion messages or following expiration of the conversion timeout period for one or more of the plurality of SMS messages.

As such, in various embodiments, the present invention provides an improved system and method for calculating a conversion rate for SMS message processing over a channel between a network operator partner and a destination network.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE INVENTION

The present invention enables real end-to-end testing of SMS messaging delivery channels with real end user SMS messages. As such, the invention does not rely on delivery reports provided by the destination network of the delivery channel.

Figure 1:
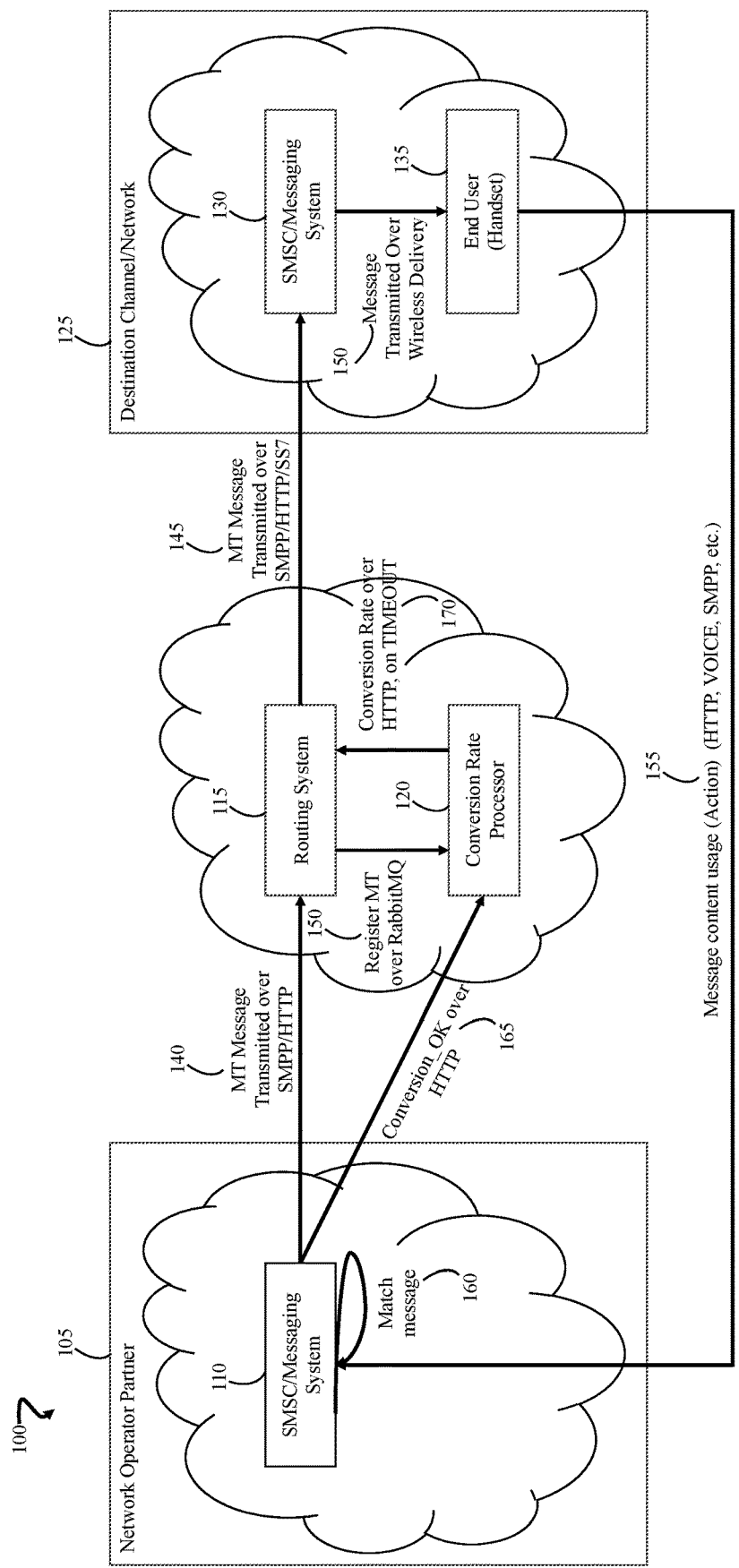
FIG. 1 is a diagram illustrating a system for determining a conversion rate for SMS messaging, in accordance with an embodiment of the present invention.

FIG. 1 is a diagram illustrating a system 100 for calculating a conversion rate for SMS messaging, in accordance with an embodiment of the present invention. As shown in FIG. 1, the system 100 includes a network operator partner 105, which includes a Short Message Service Center (SMSC) 110. The short message service center (SMSC) is commonly the element of a wireless network that handles SMS operations, such as routing, forwarding and storing incoming text messages that are destined for end users. The system 100 further includes a routing system 115 coupled to a conversion rate processor 120 and a destination network 125. The destination network 125 further includes an SMSC Messaging system 130 coupled to the end user handset 135.

In operation of the system 100, the network operator partner 105 delivers mobile-terminated (MT) messages 140 to the routing system 115. In this context, an MT message (mobile-terminated message) refers to a message that goes out from a system and is received by a subscriber's (end user's) mobile device 135. The MT messages may be transmitted to the routing system 115 using a Short Message Peer-to-Peer (SMPP) API (Application Programming Interface) or a Hypertext Transfer Protocol (HTTP) API. The routing system 115 then delivers the MT messages over an SMPP, HTTP or Signaling System 7 (SS7) 145 interface to the destination network 125. The destination network 125 then forwards the SMS messages 150 to the specific end user 135. The routing system 115 also delivers the MT messages 150 to the conversion rate processor 120.

The conversion rate processor 120 is then used to calculate a current conversion rate for the SMS messaging channel between the network operator partner 105 and the destination network 125. As such, the conversion rate processor 120 monitors a conversion timeout period 170 for each SMS message received. Additionally, the conversion rate processor 120 receives successful conversion messages (conversion_OK) from the SMSC/Messaging system 110 of the network operator partner 105, indicating that an SMS message has been acted upon by an end user 135. For example, the SMS message may include an embedded URL link and the action submitted by the end user may include selecting the embedded URL link. Alternatively, the SMS message may include instructions to enter a one-time password and the action submitted by the end user may include entering the one-time password. This examples are not intended to be limiting and various other actions performed by the end user in response to receiving an SMS message are within the scope of the present invention.

To generate the successful conversion messages, the network operator partner 105 receives notifications of message content usage 155 indicating that an end user has performed an action in response to a received SMS message. The network operator partner 105 then matches 160 the SMS message to the action 155 to generate a successful conversion message 165, for that particular SMS message. In one embodiment, the network operator partner 105 matches the action to the SMS message based upon the proximity in time between delivery of the SMS message and the receipt of the action at the network operator partner 105. The conversion rate processor then calculates a current conversion rate based upon the conversion timeout periods 170 and successful conversion messages 165, as will be discussed in more detail below. The routing system 115 may then use the calculated current conversion rate to reroute SMS messages if the conversion rate falls below an acceptable level.

Figure 2:
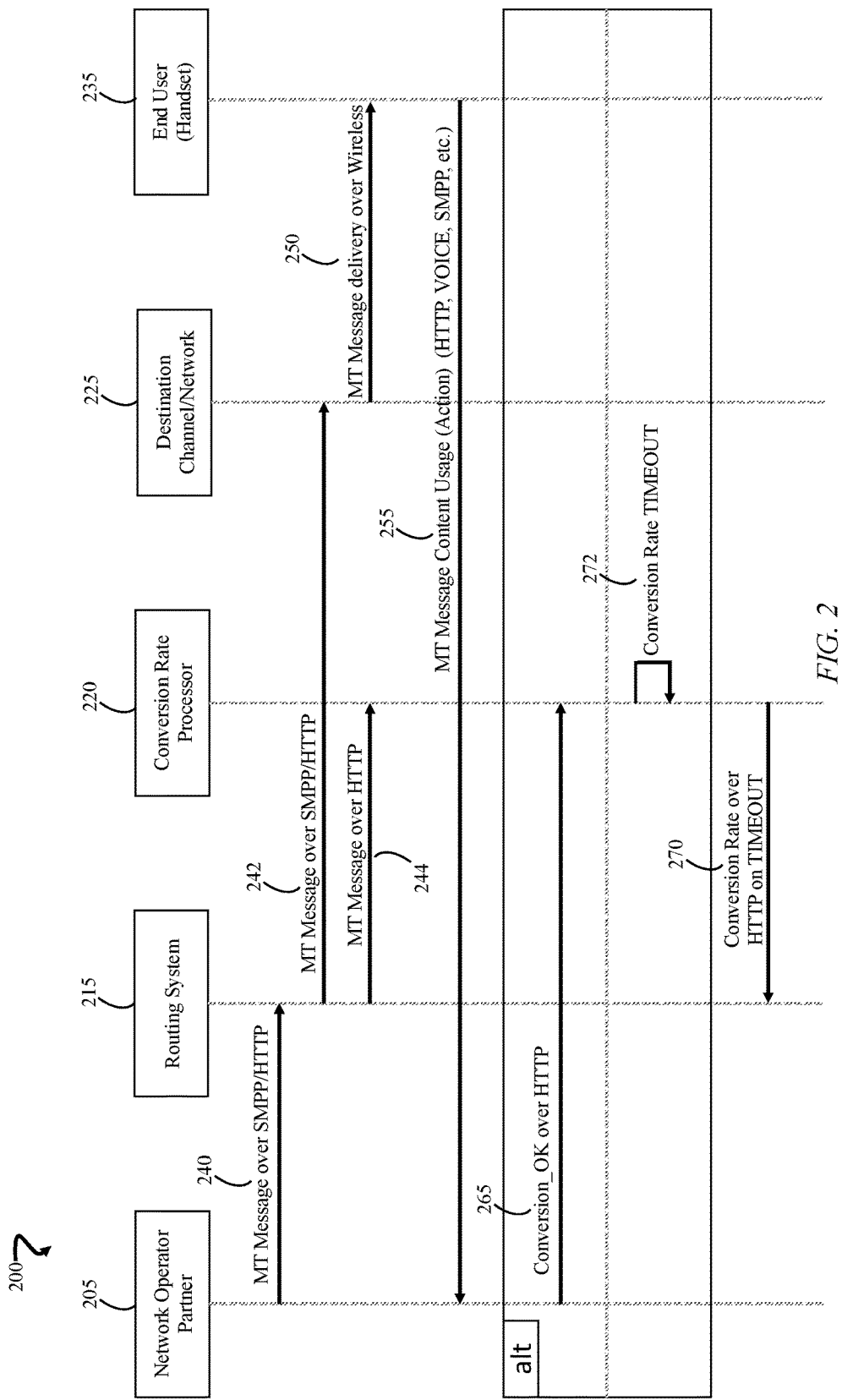
FIG. 2 is a signaling diagram illustrating the signaling flow used to determine a conversion rate for SMS messaging, in accordance with an embodiment of the present invention.

FIG. 2 is a signaling diagram 200 for calculating a conversion rate for SMS messaging, in accordance with an embodiment of the present invention. As shown in FIG. 2, the system 200 includes a network operator partner 205, a routing system 215, a conversion rate processor 220 a destination network 225 and an end user's mobile device 235. In operation, the network operator partner 205 transmits a plurality of mobile-terminated (MT) messages over a Short Message Peer-to-Peer (SMPP) API (Application Programming Interface) or a Hypertext Transfer Protocol (HTTP) API 240. The MT message is received at the routing system 215. The routing system 215 then forwards the MT messages over the SMPP/HTTP channel 242 to the destination network 225 and also forwards the MT messages over an HTTP channel 244 to the conversion rate processor 220. The destination network 225 then transmits the MT messages 250 to the end user to complete the delivery of the SMS messages generated by the network operator partner 205 to the end user 235 over the channel.

The conversion rate processor 220 monitors a conversion timeout period 272 for each of the plurality of SMS messages. Additionally, the network operator partner 205 detects if an action 255 has been performed by the end user 235 in response to each of the plurality of SMS messages 255. If the network operator partner 205 detects that an action 255 has been performed by the end user 235 prior to the expiration of the conversion timeout period for the SMS message, then the network operator partner 205 generates a successful conversion message (conversion_OK) and transmits the successful conversion message over HTTP 265 to the conversion rate processor. If the successful conversion message is not generated prior to the expiration of the conversion timeout period 272 for the SMS message, then the conversion rate processor 220 detects a timeout condition for the SMS message. The conversion rate processor 220 is used to calculate a current conversion rate following the receipt of one or more successful conversion messages 265 at the current conversion rate processor or following expiration of the conversion timeout period 272 for one or more of the plurality of SMS messages. The conversion rate processor 220 may then provide the current conversion rate to the routing system 215 over HTTP 270.

In one embodiment, calculating the current conversion rate includes, identifying a current conversion rate time window, determining a total number of SMS messages ($N_1$) of the plurality of SMS messages submitted by the network operator partner during the current conversion rate time window, determining a number of successful conversion messages ($N_2$) received at the conversion rate processor during the current conversion rate time window and calculating the current conversion rate (CR) as $$CR = \frac{\min(N_1, N_2)}{N_1}.$$

In a particular embodiment, the current conversion rate time window may be set to 3 minutes, however, this is not intended to be limiting.

To enable rerouting of SMS traffic in response to a decrease in the successful conversion rate, the routing system 215 may additionally compare the current conversion rate and a reference conversion rate to determine if the conversion rate between a particular network operator partner 205 and a destination network 235 has dropped below an acceptable level. As such, the routing system 215 compares the current conversion rate and a reference conversion rate and flags destination network 235 and network operator partner 205 combination if the current conversion rate exceeds a predetermined threshold.

In one particular embodiment, the reference conversion rate is a historical aggregated exponential weighted moving average ($EWMA_n$) calculated as:

$$EWMA_n = \begin{cases} CR_1 & n = 1 \\ \alpha \times CR_n \div (1 - \alpha) \times EWMA_{n-1}, & n > 1 \end{cases}$$

over a period of time with n current conversion rate samples.

The reference conversion rate may be initialized to a value of 1 prior to the first comparison between the current conversion rate and the reference conversion rate.

As such, when a destination network and network operator partner combination has been flagged, the delivery of subsequent SMS messages may be rerouted to a different destination network.

Figure 3:
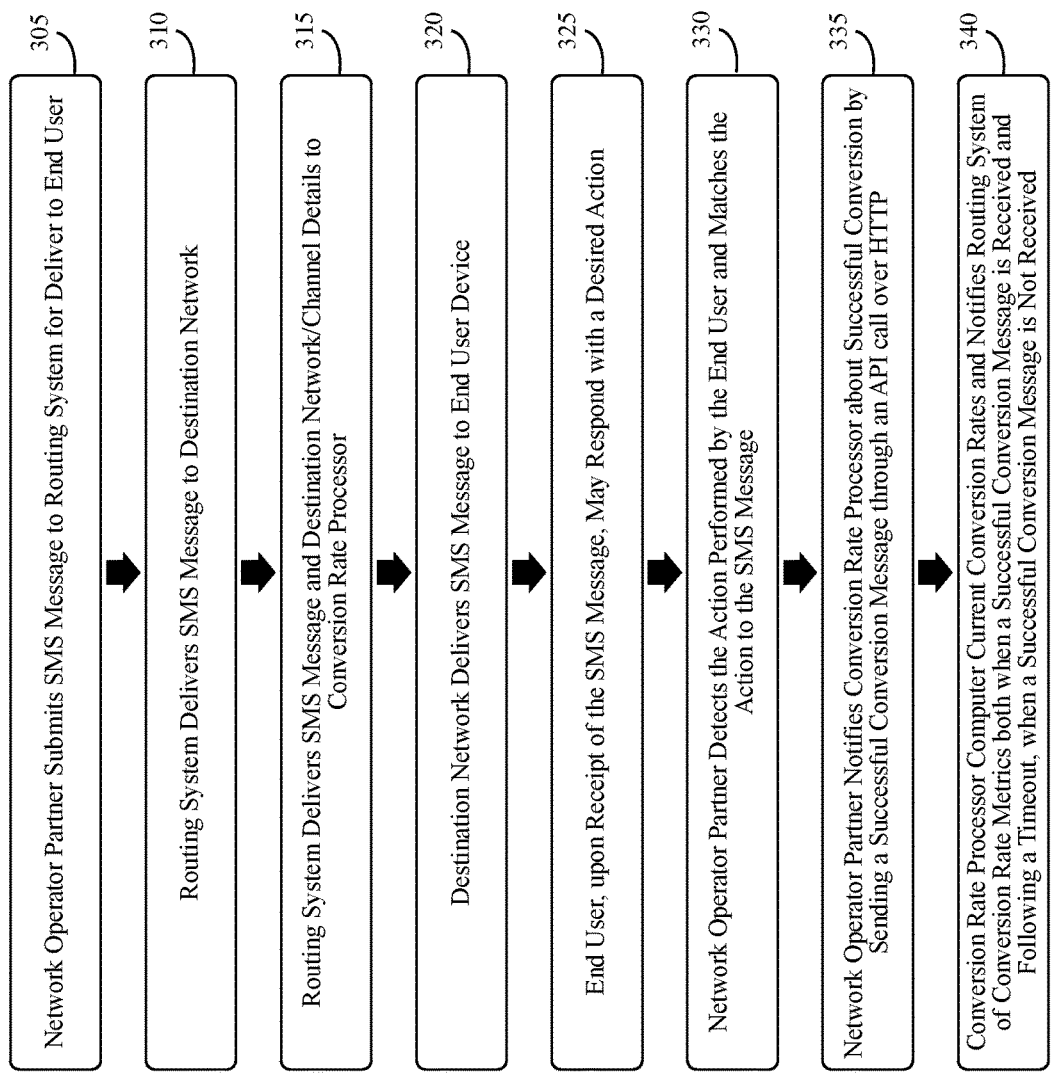
FIG. 3 is a flow diagram illustrating a method for determining a conversion rate for SMS messaging, in accordance with an embodiment of the present invention.

With reference to FIG. 3, a flow diagram 300 of the method steps performed by the present invention for calculating a current conversion rate is illustrated. At step 305, the network operator partner submits an SMS message to the routing system for delivery to an end user. At step 310, the routing system delivers the SMS message to the destination network and at step 315, the routing system delivers the SMS message and destination network/channel details to the conversion rate processor. The destination network then delivers the SMS message to the end user device at step 320.

For the calculation of the conversion rate, at step 325, upon receipt of the SMS message, the end user may respond with a desired action. At step 330, the network operator may then detect the action performed by the end user and match the action to the SMS message. At step 335, the network operator partner then notifies the conversion rate processor about the successful conversion of the SMS message by sending a successful conversion message through an API call over HTTP. In the final step 340, the conversion rate processor then computes the current conversion rates and notifies the routing system of the conversion rate metrics, both when a successful conversion message is received and following a timeout of the conversion time period, when a successful conversion message is not received.

In accordance with the present invention, every network operator partner who subscribes to the services offered by the invention is treated separately. The invention ensures that SMS messages sent for that specific network operator partner will be considered for further measurements. For every SMS message sent, the invention waits for a predetermined time period (e.g., 3 minutes) to receive the successful conversion message from the network operator partner. If the successful conversion message is not received within this time period, the associated SMS message is classified as not delivered.

The weighted moving average is calculated separately for every network operator partner, per delivering channel, and destination network, which enables the invention to precisely identify any delivery issues. The weighted moving averages may be aggregated on a daily basis, and a reference value may be created for a predefined time period, for example, 30 days.

The invention employs various strategies for unflagging of network operator partner and destination network combinations, some examples of which include controlled manual unflagging and automatic unflagging via probing the flagged combinations. Additionally, the invention may create reports for the delivery rate of all delivering channel and destination network combinations, which may include historical data. Therefore, the invention can verify in real time the trend of delivery rates for any destination.

Alerts may be created if a flag is set. In a particular embodiment, the invention generates and transmits automatic emails warnings to network operator partners in the case of a flagging event.

Additionally, the time window of waiting for successful conversion messages, the weighting of the moving average, the time frame of the reference value, and customer-specific settings are all configurable. A key factor for quick detection of service interruptions is detection of conversion rate drops in a short time window. By tracking the weighted moving average, the invention gives new messages a higher weighting than the historical conversion rate, so that recent events have a higher impact on the overall conversion rate.

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

While methods, apparatuses, and systems have been described in connection with exemplary embodiments of the various figures, it is to be understood that other similar embodiments can be used or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A method for determining a current conversion rate for Short Message Service (SMS) messaging, the method comprising:

submitting a plurality of SMS messages to a routing system, wherein the SMS messages are submitted by a network operator partner and are destined for an end user;

delivering the plurality of SMS messages to a destination network using the routing system;

delivering the plurality of SMS messages to a conversion rate processor using the routing system;

monitoring a conversion timeout period for each of the plurality of SMS messages at the conversion rate processor;

delivering the plurality of SMS messages to the end user using the destination network;

detecting, by the network operator partner, if an action has been performed by the end user in response to each of the plurality of SMS messages, generating a successful conversion message at the network operator for the SMS message if the action is performed by the end user prior to the expiration of the conversion timeout period for the SMS message and delivering the successful conversion message to the conversion rate processor;

calculating a current conversion rate at the conversion rate processor following the receipt of one or more successful conversion messages at the current conversion rate processor or following expiration of the conversion timeout period for one or more of the plurality of SMS messages;

providing the current conversion rate to the routing system;

comparing the current conversion rate and a reference conversion rate at the routing system; and flagging the destination network and network operator partner combination if the current conversion rate exceeds a predetermined threshold.

2. The method of claim 1, further comprising:

when a destination network and network operator partner combination has been flagged;

rerouting subsequent SMS messages between the flagged destination network and network operator partner combination to a different destination network over the routing system.

3. The method of claim 1, wherein calculating a current conversion rate further comprises:

identifying a current conversion rate time window;

determining a total number of SMS messages ($N_1$) of the plurality of SMS messages submitted by the network operator partner during the current conversion rate time window; and determining a number of successful conversion messages ($N_2$) received at the conversion rate processor during the current conversion rate time window; and calculating the current conversion rate (CR) as $$CR = \frac{\min(N_1, N_2)}{N_1}.$$

4. The method of claim 1, wherein the reference conversion rate is a historical aggregated exponential weighted moving average ($EWMA_n$) calculated as:

$$EWMA_n = \begin{cases} CR_1 & n = 1 \\ \alpha \times CR_n \div (1 - \alpha) \times EWMA_{n-1}, & n > 1 \end{cases}$$

over a period of time with n current conversion rate samples.

5. The method of claim 1, wherein detecting, by the network operator partner, if an action has been performed by the end user in response to each of the plurality of SMS messages further comprises:
receiving the action associated with the SMS message at the network operator; and
matching the action to the SMS message based upon the proximity in time of the action to the SMS message.

6. The method of claim 1, wherein delivering the SMS message to the conversion rate processor further comprises delivering one or more destination network details to the conversion rate processor.

7. The method of claim 1, wherein the SMS message includes an embedded URL link and wherein the action submitted by the end user includes selecting the embedded URL link.

8. The method of claim 1, wherein the SMS message includes instructions to enter a one-time password and wherein the action submitted by the end user includes entering the one-time password.

9. A system for determining a current conversion rate for Short Message Service (SMS) messaging, the system comprising:
a routing system for receiving a plurality of SMS messages from a network operator partner, for delivering the plurality of SMS messages to a destination network and for delivering the plurality of SMS messages to a conversion rate processor, wherein the plurality of SMS messages are destined for an end user;
the conversion rate processor for monitoring a conversion timeout period for each of the plurality of SMS messages and for calculating a current conversion rate following the receipt of one or more successful conversion messages from the network operator partner or following expiration of the conversion timeout period for one or more of the plurality of SMS messages, wherein the one or more successful conversion messages are provided to the conversion rate processor from the network operator partner in response to an action being performed by the end user in response to one of the plurality of SMS messages prior to the expiration of the conversion timeout period for the SMS message; and
wherein the routing system is further for comparing the current conversion rate and a reference conversion rate and for flagging a destination network and network operator partner combination if the current conversion rate exceeds a predetermined threshold.

10. The system of claim 9, wherein the routing system is further for rerouting subsequent SMS messages between the flagged destination network and network operator partner combination to a different destination network over the routing system if the current conversion rate exceeds a predetermined threshold.

11. The system of claim 9, wherein calculating a current conversion rate by the conversion rate processor further comprises:
identifying a current conversion rate time window;
determining a total number of SMS messages ($N_1$) of the plurality of SMS messages submitted by the network operator partner during the current conversion rate time window; and
determining a number of successful conversion messages ($N_2$) received at the conversion rate processor during the current conversion rate time window; and
calculating the current conversion rate (CR) as $$CR = \frac{\min(N_1, N_2)}{N_1}.$$

12. The system of claim 10, wherein the reference conversion rate is a historical aggregated exponential weighted moving average ($EWMA_n$) calculated as:

$$EWMA_n = \begin{cases} CR_1 & n = 1 \\ \alpha \times CR_n \div (1 - \alpha) \times EWMA_{n-1}, & n > 1 \end{cases}$$

over a period of time with n current conversion rate samples.

13. The system of claim 9, wherein the network operator partner is further for receiving the action associated with the SMS message and matching the action to the SMS message based upon the proximity in time of the action to the SMS message.

14. The system of claim 9, wherein the SMS message includes an embedded URL link and wherein the action submitted by the end user includes selecting the embedded URL link.

15. The system of claim 9, wherein the SMS message includes instructions to enter a one-time password and wherein the action submitted by the end user includes entering the one-time password.

16. A computer program product comprising computer executable instructions embodied in a non-transitory computer-readable medium for performing steps to determine a current conversion rate for Short Message Service (SMS) messaging, the steps may include:
submitting a plurality of SMS messages to a routing system, wherein the SMS messages are submitted by a network operator partner and are destined for an end user;
delivering the plurality of SMS messages to a destination network using the routing system;
delivering the plurality of SMS messages to a conversion rate processor using the routing system;
monitoring a conversion timeout period for each of the plurality of SMS messages at the conversion rate processor;
delivering the plurality of SMS messages to the end user using the destination network;

detecting, by the network operator partner, if an action has been performed by the end user in response to each of the plurality of SMS messages, generating a successful conversion message at the network operator for the SMS message if the action is performed by the end user prior to the expiration of the conversion timeout period for the SMS message and delivering the successful conversion message to the conversion rate processor;

calculating a current conversion rate at the conversion rate processor following the receipt of one or more successful conversion messages at the current conversion rate processor or following expiration of the conversion timeout period for one or more of the plurality of SMS messages;

providing the current conversion rate to the routing system;

comparing the current conversion rate and a reference conversion rate; and flagging a destination network and network operator partner combination if the current conversion rate exceeds a predetermined threshold.

17. The computer program product of claim 16, the steps further comprising, rerouting subsequent SMS messages between the flagged destination network and network operator partner combination to a different destination network over the routing system if the current conversion rate exceeds a predetermined threshold.

18. The computer program product of claim 16, wherein calculating a current conversion rate by the conversion rate processor further comprises:

identifying a current conversion rate time window;

determining a total number of SMS messages ($N_1$) of the plurality of SMS messages submitted by the network operator partner during the current conversion rate time window; and determining a number of successful conversion messages ($N_2$) received at the conversion rate processor during the current conversion rate time window; and calculating the current conversion rate (CR) as $$CR = \frac{\min(N_1, N_2)}{N_1}.$$

19. The computer program product of claim 17, wherein the reference conversion rate is a historical aggregated exponential weighted moving average ($EWMA_n$) calculated as:

$$EWMA_n = \begin{cases} CR_1 & n = 1 \\ \alpha \times CR_n \div (1 - \alpha) \times EWMA_{n-1}, & n > 1 \end{cases}$$

over a period of time with n current conversion rate samples.

* * * * *